UNITED STATES PATENT OFFICE.

JAMES DUNCAN, OF LONDON, ENGLAND.

IMPROVEMENT IN THE TREATMENT OF SUGAR AND OF CANE-JUICE.

Specification forming part of Letters Patent No. 152,832, dated July 7, 1874; application filed June 22, 1874.

*To all whom it may concern:*

Be it known that I, JAMES DUNCAN, of Mincing Lane, in the city of London, England, sugar-refiner, have invented Improvements in the Treatment of Sugar and of Cane-Juice, of which the following is a specification:

Sugar, but more especially cane-sugar, contains more or less glucose. The glucose prevents the crystallization of the crystallizable sugar, and its removal is a matter of considerable importance. When a solution of cane-sugar is heated with an excess of caustic lime the whole of the glucose is destroyed; but the lime must be removed before the solution can be refined.

My invention consists in the employment of dilute sulphuric acid, for the purpose of converting the lime into sulphate of lime, with the following result:

In the case of raw cane-sugar, the sugar is melted to a density of about 25° Baumé. The amount of glucose is then determined, and about an equal weight of lime to the amount of glucose is added to the solution. The whole is then well mixed and heated. I have found a temperature not exceeding 170° Fahrenheit to be most beneficial for this purpose. When the glucose is destroyed the lime is nearly all converted into sulphate by the addition of dilute sulphuric acid. I prefer, however, to leave the liquid slightly alkaline, and to neutralize the rest of the alkali with sulphate of alumina, which is added until the solution is decidedly acid. This part of the process should be conducted rapidly, and, as soon as the liquid is found to be acid, chalk or whiting is to be added, so as to completely neutralize the mineral and organic acids. The solution is then heated and filtered, and passed through the usual stages of the refining process.

Although raw cane-sugar is hereinbefore mentioned, this process is also applicable to the treatment of raw beet-sugar, and the sugars of the date-palm.

In treating cane-juice, I proceed in the same manner, only, instead of leaving the liquid alkaline, I make it acid by means of sulphuric acid, and neutralize the excess of sulphuric acid with sulphite of lime, which tends to improve the color of the sugar; but the juice may be treated in the same way as the raw-sugar solutions, and sulphurous acid added before boiling.

I claim—

1. The reduction of the glucose in sugar by means of lime, and the precipitation of the lime by means of sulphuric acid, as hereinbefore described.

2. The neutralization of the free acids arising in the course of the foregoing process by means of carbonate of lime.

In witness whereof I have signed my name to this specification in the presence of two subscribing witnesses.

JAMES DUNCAN.

Witnesses:
CHAS. MILLS,
    47 *Lincoln's Inn Fields, London.*
A. E. COVENTON,
    92 *Mincing Lane, London.*